United States Patent [19]
Nogaito et al.

[11] 3,795,787
[45] Mar. 5, 1974

[54] HEAT FIXING SYSTEM IN AN ELECTROPHOTOGRAPHIC COPYING MACHINE HAVING A TEMPERATURE CONTROL DEVICE

[76] Inventors: Tadao Nogaito, 2-17-56, Iruma-cho, Chofu-shi, Tokyo; Yasuhiro Fujita, 1-239, Tennuma-cho, Oomiya-shi, Saitama; Kenichi Watabiki, 245-2, Hiyoshi-cho, Koohoku-ku, Yokohama-shi, Kanagawa, all of Japan

[22] Filed: Aug. 18, 1972

[21] Appl. No.: 281,926

[30] Foreign Application Priority Data
Aug. 19, 1971 Japan.......................... 46-73883[U]

[52] U.S. Cl. .............................................. 219/216
[51] Int. Cl. ............................................. H05b 1/00
[58] Field of Search ...... 219/216, 388, 501; 263/65; 118/637; 117/17.5

[56] References Cited
UNITED STATES PATENTS

| | | | |
|---|---|---|---|
| 3,497,671 | 2/1970 | Schayes et al. | 219/501 X |
| 3,705,289 | 12/1972 | Szostak | 219/216 |
| 3,475,593 | 10/1969 | Olofsson et al. | 219/501 |

*Primary Examiner*—C. L. Albritton
*Attorney, Agent, or Firm*—Gerald J. Ferguson, Jr.

[57] ABSTRACT

A heat fixing system in an electrophotographic copying machine having a temperature control device, the device comprising means for generating a sensing signal proportional to the average radiant temperature produced by the heat fixing system, means responsive to the sensing signal for generating a control signal comprising a pulse train of variable width, constant period pulses, the width of the pulses being an inverse function of the average radiant temperature, and controllable means responsive to the control signal for regulating the power supplied to the heat fixing system.

1 Claim, 7 Drawing Figures

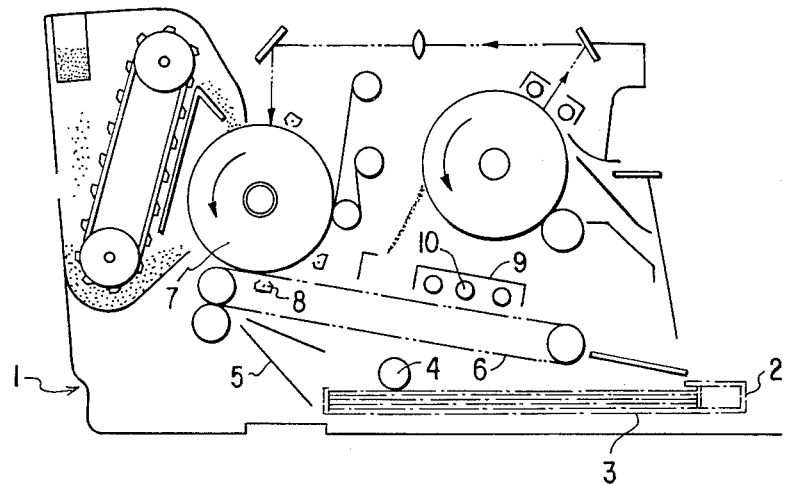
FIG. 1
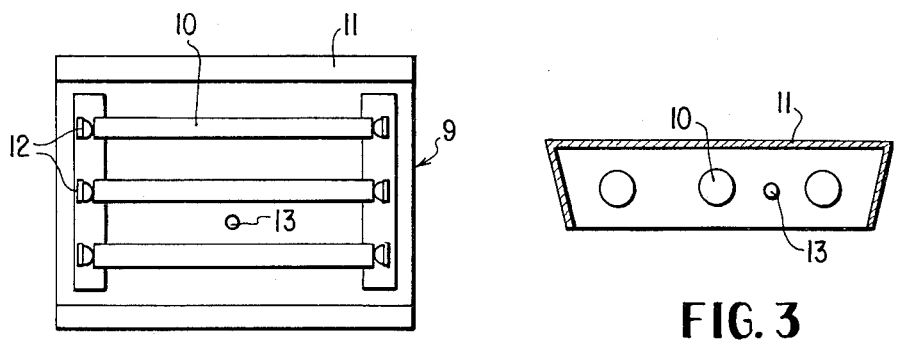
FIG. 2
FIG. 3
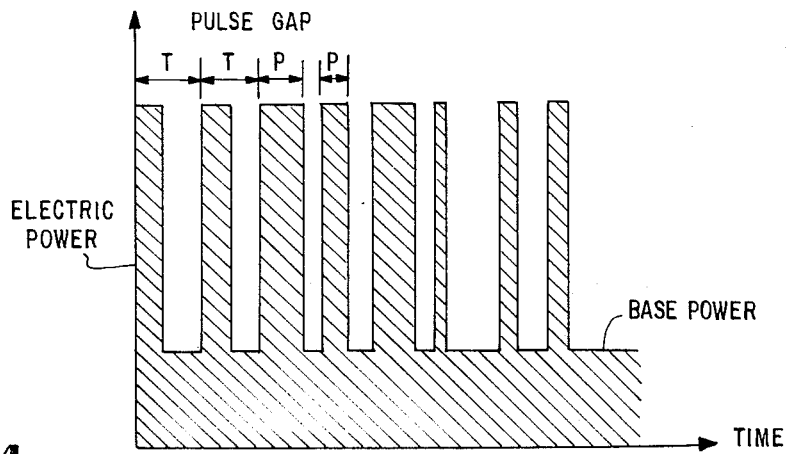
FIG. 4

HEAT FIXING SYSTEM IN AN ELECTROPHOTOGRAPHIC COPYING MACHINE HAVING A TEMPERATURE CONTROL DEVICE

BACKGROUND OF THE INVENTION

1. Field of the Invention

This invention relates to a temperature control device which automatically controls the temperature of a heat fixing system in an electrophotographic copying machine.

2. Discussion of the Prior Art

The conventional electrophotographic copying machine uses a heat fixing system and is provided with a temperature control device in the heat fixing system for carrying out the fixing operation. In the conventional temperature control device, a voltage control system is used, and, accordingly, it has not been possible to make the range of the fixing temperature large. Further, it has been difficult to obtain an appropriate fixing temperature with respect to the heat capacity of the paper used and the environment of the copying machine. Thus, malfixing or overfixing has resulted. Hence, sharp reproduction images have not been obtained in conventional copying machines.

SUMMARY OF THE INVENTION

This invention aims to eliminate such defects of the prior art, and the object thereof is to provide a temperature control device with a comparatively simple construction in which the range of the fixing temperature is made large by controlling a heat radiation source in the copying machine by means of so-called on-off time division control whereby the range of the fixing temperature can be properly determined according to the conditions of the paper used and the environment of the copying machine.

Other objects and advantages of this invention will become apparent upon reading the appended claims in conjunction with the following detailed description and the attached drawing:

BRIEF DESCRIPTION OF THE DRAWING

FIG. 1 is a schematic view showing of a copying machine provided with a device in accordance with the present invention.

FIG. 2 is a bottom view of an illustrative heat fixing system.

FIG. 3 is an elevational sectional view of the system of FIG. 2.

FIG. 4 is a view of an illustrative waveform generated by the control device during operation thereof.

DESCRIPTION OF A PREFERRED EMBODIMENT

Figure 5:
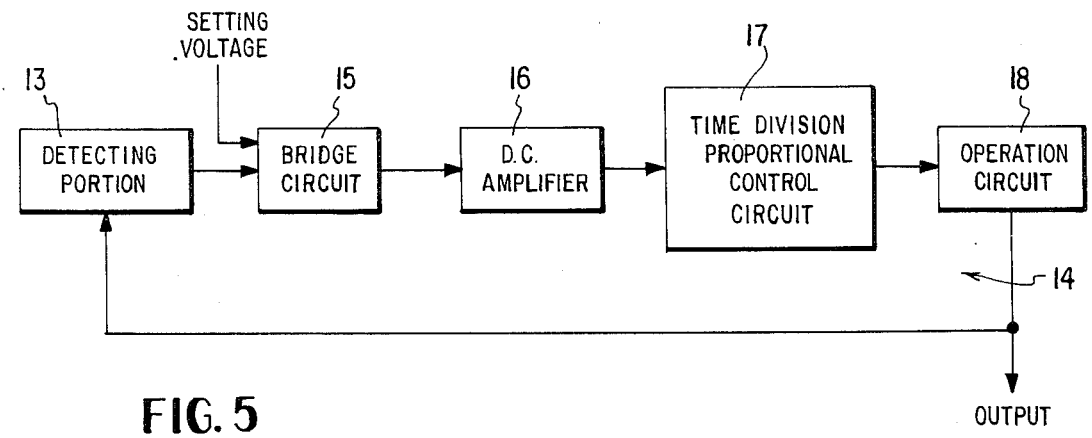
FIG. 5 is a block diagram of an illustrative control device.

FIG. 1 is a schematic view of an electrophotographic copying machine having the device of this invention therein. There is provided a body 1, a paper feed plate 2 located at the bottom of the body, and copying papers 3 piled up on said paper feed plate 2. The papers 3 are fed by a paper feed roller 4 to a guide 5 one by one. Above the paper feed plate 2 and the guide 5 is provided a feed chain 6 for feeding the copying paper 3, whereby the copying paper 3 fed thereto by way of the guide 5 is further fed to under a selenium drum 7. Under the selenium drum 7 is provided a transfer device 8 for transferring the toner sticking to the surface of the selenium drum 7 to the copying paper 3. The copying paper 3 on which the desired image is transferred by means of the transfer device 8 is fed to a fixing system 9 by the feed chain 6 so that the image is fixed by a heat radiation source 10 located in the fixing system.

The fixing system 9 has, as shown in FIG. 2, a box shaped bracket 11 fixed by appropriate means not shown to the body 1, the system 9 having an open end at the lower part thereof. In the bracket 11 are supported at least one heat radiation source 10 such as a quartz-tube lamp which is secured by means of fitting springs 12. A detecting portion 13 is located between the heat radiation sources 10 at a position where the average radiant energy is received. This detecting portion 13 consists of a measuring element which measures temperature such as a thermocouple, and the temperature within the bracket 11 detected by the detecting portion 13 is applied to a control circuit 14 as an input signal which controls an electric source which supplies power to said heat radiation source 10. The electric power source is normally but not necessarily supplied with a constant base power for increasing the durability of the heat radiation source 10 as shown in FIG. 4. Typical illustrative circuits for supplying power to the radiation source 10 are described in more detail hereinafter.

The control circuit 14 may be as shown in FIG. 5. That is, the temperature measuring signal produced by the detecting portion 13 is transmitted to a time division proportional control circuit 17 through a bridge circuit 15 and a D.C. amplifier 16 where the bridge circuit detects the difference between the signal from detecting portion 13 and a setting signal which corresponds to the desired operating temperature of the system. The time division proportional control circuit 17 varies the on-off time in proportion to the temperature signal detected by the detecting portion 13. At the output side of the time division proportional control circuit 17 is provided a pulse signal having a duration time of P proportional to the temperature signal which operates an operation circuit 18 connected with the output side of the time division proportional control circuit 17. The operation circuit 18 is typically a semiconductor switch. A feedback connection is illustrated to indicate that negative feedback may be optionally provided. The time divisional proportional control circuit 18 may typically be a free-running multi-vibrator wherein the D.C. signal output from amplifier 16 is used to control the width of the generated pulses. Other circuits for generating variable width pulses proportional to a D.C. control signal are also known to those of ordinary skill in this art.

Figure 6:
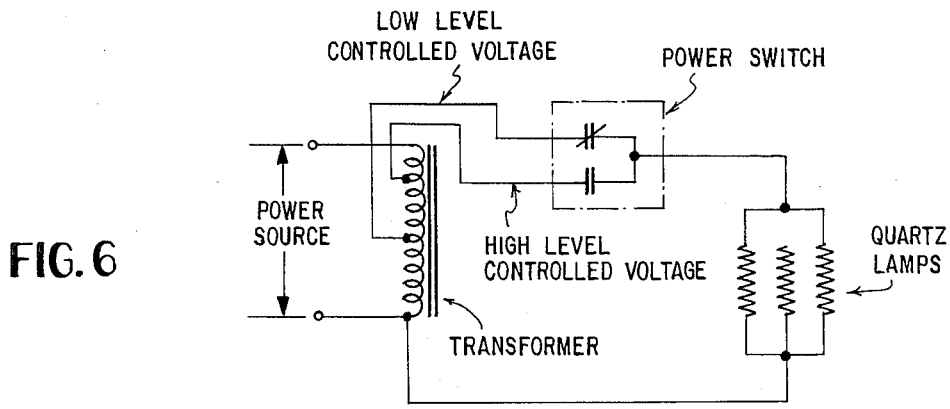
FIGS. 6 and 7 are circuit diagrams of illustrative circuits for supplying power to a heat radiation source.
Figure 7:
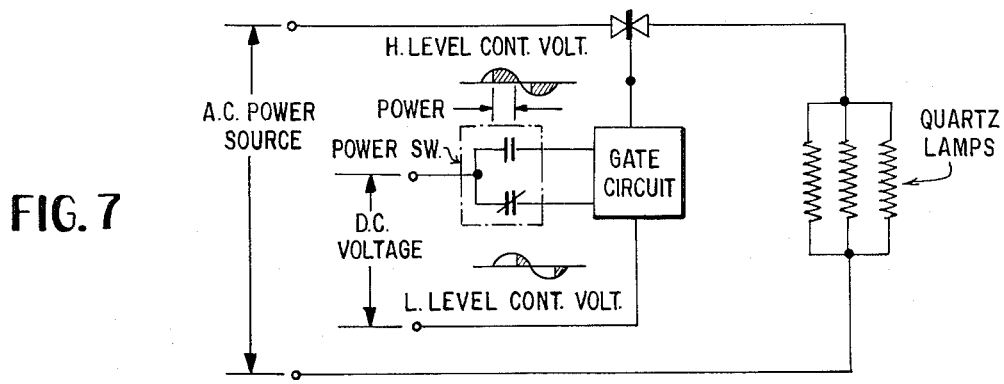

Referring to FIGS. 6 and 7, these are shown illustrative circuits for supplying electric power to the quartz lamps whereby the output signal from control circuit 14 is applied to either or both of the relays comprising the power switch shown in either FIG. 6 or 7 to thereby energize the heat radiation source or quartz lamps 10 from the A.C. source.

Thus, the temperature within the fixing system 9 detected by the detecting portion 13 is impressed on the control circuit 14 as an input signal and the control circuit 14 controls the power source circuit according to the temperature signal from the detecting portion 13 so as to supply a power in series of pulses having varied duration P to the heat radiation source 10. That is, if the temperature in the fixing system 9 rises, the duration P of the pulse becomes short and vice versa to control the temperature in the fixing system. Accordingly, the range of the fixing temperature can be made large, whereby the result of fixing is not influenced by variation in heat capacity of the copying paper 3 and environment of the copying machine. Further, the measuring element of the detecting portion 13 is preferred to have a small time constant, and the power circuit of FIGS. 6 and 7 may be constructed integrally with the control circuit 14.

Since the present invention provides a wide range of fixing temperatures as described hereinbefore, it is not necessary to control the fixing temperature in response to variation in thickness of the copying paper or variation in environment of the copying machine, and any malfunction of the fixer or overfixing due to said variations can be effectively prevented. In addition, the construction of the copying machine per se can be simplified in comparison with the conventional machine of this type since accuracy requirements are not so severely high as in conventional copying machines, and, accordingly, the cost for manufacturing the same is lowered.

Numerous modifications of the invention will become apparent to one of ordinary skill in the art upon reading the foregoing disclosure. During such a reading, it will be evident that this invention provides a heat fixing system in an electrophotographic copying machine having a temperature control device for accomplishing the objects and advantages hereinstated.

What is claimed is:

1. A heat fixing system in an electrophotographic copying machine having a temperature control device, said device comprising:

heat radiation means disposed adjacent the path traveled by copy papers;

bracket means for mounting said heat radiation means, said bracket means being enclosed except for an open face directed to said path traveled by the copy papers;

detecting means mounted in said bracket adjacent said path traveled by said copy papers for generating a sensing signal proportional to the heat capacity of the copy papers and the environmental conditions under which said copying machine is operated;

means for setting said heat fixing system to a desired operating temperature, a setting signal being produced thereby representative of said desired operating temperatures;

means responsive to the difference between said setting signal and said sensing signal for generating a control signal comprising a pulse train of variable width, constant period pulses, the width of the pulses being an inverse function of said average radiant temperature so that the fixing effected by said system is not influenced by variation in the said heat capacity of the copy paper and the said environmental conditions in the copying machine; and controllable means responsive to said control signal for regulating the power supplied to said heat radiation means.

* * * * *